Nov. 25, 1952 C. C. CUTLER 2,619,543

FREQUENCY CHANGING PULSE REPEATER EMPLOYING PHASE MODULATION

Filed July 11, 1950 2 SHEETS—SHEET 1

INVENTOR
C. C. CUTLER
BY George C. Lord
ATTORNEY

INVENTOR
C. C. CUTLER
BY Geo. C. Lord
ATTORNEY

Patented Nov. 25, 1952 2,619,543

UNITED STATES PATENT OFFICE 2,619,543

FREQUENCY CHANGING PULSE REPEATER EMPLOYING PHASE MODULATION

Cassius C. Cutler, Gillette, N. J., assignor to Bell Telephone Laboratories, Incorporated, New York, N. Y., a corporation of New York Application July 11, 1950, Serial No. 173,204

22 Claims. (Cl. 178—70)

This invention relates to repeaters and more particularly to frequency changing repeaters for use in pulsed microwave radio relay systems.

When pulse modulation is employed in communication systems, it is convenient in many instances to employ pulsed microwave radio as the medium of transmission. Such systems involve the provision of transmitting and receiving terminals and in addition require a plurality of repeater stations located between the terminals. The number and location of such repeater stations depend upon the familiar line of sight limitation upon microwave radio transmission and upon the necessity for restoring signal levels to acceptable values thereby to avoid degradation of the transmitted intelligence. In order to prevent crosstalk between the received and retransmitted signals, it is often necessary at each repeater station to shift the center frequency of the radio frequency pulses so that the center frequency of those transmitted from the station differs from that of those received by a substantial amount. (A radio frequency pulse may be considered as being made up of a plurality of separate component frequencies the amplitude and frequency of each component being determinable by Fourier analysis. The mean frequency of these components is designated as the center frequency.) In addition to such shifting of the center frequency of the radio frequency pulses at each repeater point, it is also desirable in many instances to reform or reshape the pulses. Such shaping of the pulses is particularly desirable in pulse code modulation systems where, if desired, complete regeneration may be employed at each repeater without in any way affecting the transmission of intelligence.

Heretofore, repeater apparatus for pulsed microwave communication systems has been relatively costly and complex, ordinarily involving the provision of a receiver with means for demodulating the radio frequency signals received, and additional circuits for remodulating and transmitting these signals at a different center frequency. It has been common to include in such equipment pulse clipping and gating circuits to improve the shape of the pulses, thereby to reduce errors of reproduction resulting from noise distortion and other causes. Because of the large number of circuits required to satisfactorily perform the various functions indicated above, the repeater stations have accounted for a relatively large part of the total cost of microwave radio relay systems.

It is, accordingly, an object of the invention to provide efficient frequency changing pulse repeaters which are capable of performing the necessary functions as outlined above and yet require only a small number of simple circuits.

It is a further object of the invention to provide a repeater in which frequency changing and reshaping or gating of the pulses may be accomplished in a single operation.

Additional objects include the provision of simplified gating and pulse generating circuits for radio frequency pulses which do not require for their operation the provision of precisely timed trains of control pulses.

In a pulse repeater according to the invention there is provided a pulse amplifier and circuits are arranged to permit the application of a periodically varying wave the frequency of which is related to the repetition rate or frequency of the incoming radio frequency pulses to the amplifier in such a way as to phase modulate the pulses passing therethrough. In a specific embodiment, the pulse amplifier may comprise a traveling wave tube the beam voltage of which is varied sinusoidally at a frequency equal to the pulse repetition frequency to provide phase modulation of the signal pulses. Also in accordance with the invention and where a traveling wave amplifier is employed, the frequency and amplitude of the phase modulating wave are so chosen that the amplification of the amplifier may be varied over wide limits to effectively gate the applied pulses or to generate pulses from a continuous radio frequency signal applied to the amplifier.

The above and other features of the invention will be described in greater detail in the following specification taken in connection with the drawings in which.

In general and in accordance with the invention the center frequency of a radio frequency pulse may be shifted by applying the pulse to an amplifier to which is also applied a continuous wave modulating signal, the frequency, relative phase and mode of application being such as to produce a phase modulation of signals traversing the amplifier. The input signal may be expressed in general form as:

$$E_{in}=EGe^{j(\omega t+\Phi_0)}$$

where G(t) is the gain of the amplifier as a function of time, $\Phi_0$ is the phase angle of the input signal, and $\omega$ is the angular frequency.

The frequency F of the incoming signal (which may be taken as the center frequency) may be expressed in terms of the angular frequency according to the well-known relation:

$$F=\frac{\omega}{2\pi}$$

If now, the phase of the incoming signal is varied as a function of time during passage of the signal through the amplifier, the output signal may be expressed as follows:

$$E_{out}=E\cdot G\cdot e^{j\left(\omega t+\Phi_0+\frac{d\Phi}{dt}\cdot t\right)}=E\cdot G\cdot e^{j\left[\left(\omega+\frac{d\Phi}{dt}\right)t+\Phi_0\right]}$$

where $$\left(\omega+\frac{d\Phi}{dt}\right)$$

represents a new angular frequency from which a new center frequency may be derived.

Such phase modulation may be applied to shift the center frequency of applied pulses in any amplifier capable of transmitting the pulses. For example, there may be employed a conventional phase modulator in which a reactance tube is connected in the anode-cathode circuit of a conventional amplifier tube receiving the pulses, the modulating voltage being applied between the grid and cathode of the reactance tube. In the case of traveling wave and velocity variation tube amplifiers, the modulating voltage may be applied to vary the beam velocity.

Figure 1:
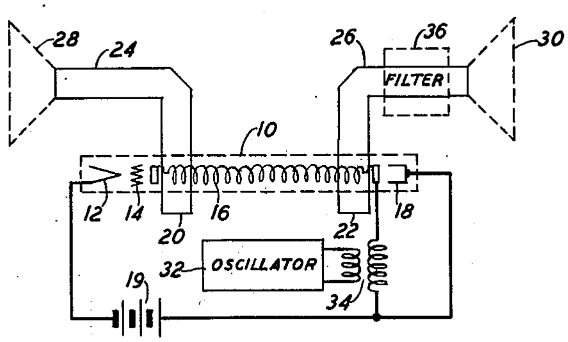
Fig. 1 is a schematic diagram of the basic repeater circuit of the invention.

In a specific embodiment as illustrated in Fig. 1 of the drawings, a traveling wave tube is employed as the amplifier. Such amplifiers have been described in articles in I. R. E. Proceedings for February 1947, entitled "Traveling wave tubes," by J. R. Pierce and L. M. Field at page 108; "Theory of beam type traveling wave tubes," by J. R. Pierce at page 111, and "The traveling wave tube as amplifier at microwaves," by R. Kompfner at page 124.

The amplifier shown in Fig. 1 comprises an envelope 10 having mounted therein a cathode 12, a grid 14, a helix 16 and a collector 18. A source of direct-current voltage 19 is connected between the helix and cathode to render the former positive with respect to the latter, and the collector is operated at substantially the same voltage as the helix. Input and output connections to the amplifier are made by means of suitable transducers 20 and 22 connected to input and output wave guides 24 and 26 respectively. Input and output antennas 28 and 30, respectively, indicated in Fig. 1 as comprising horn type antennas may be connected to the corresponding wave guide circuits to permit use of the amplifier as a radio frequency repeater. Radio frequency pulses applied to the input of the amplifier through wave guide 24 may be phase modulated by varying the velocity of the electron beam while each of the pulses is traversing the amplifier. This may be accomplished by applying a periodic wave between the cathode and helix in series with the direct-current supply 19. As shown in Fig. 1, for example, a continuous wave is generated in an oscillator 32 and applied to the primary winding of a transformer 34, the secondary winding of which is inserted in the cathode-helix supply circuit.

Figure 2:
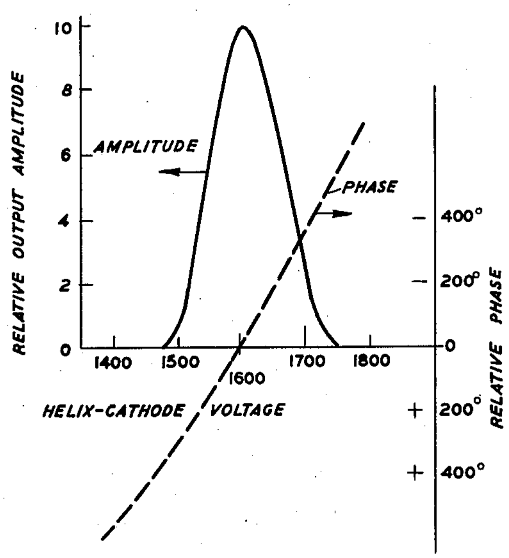
Fig. 2 is a graph showing certain of the characteristics of the circuit of Fig. 1.

As pointed out in the articles referred to above, energy applied to the input of a traveling wave amplifier is amplified only when the velocity along the helix of the input electromagnetic wave approximates the velocity of the electron beam as determined by the cathode-helix or beam voltage. The range of beam voltages for which amplification takes place is relatively limited and is shown for a typical traveling wave amplifier by the solid curve of Fig. 2. If, however, the phase modulating signal varies the beam voltage within the range so delineated, the phase of the output signals may be shifted relatively to that of the input signal. The dashed-line curve of Fig. 2 illustrates the extent of the phase shift obtainable in this fashion and it will be noted that positive and negative shifts of phase with corresponding changes in the center frequency of the applied radio frequency pulses may be obtained by varying the beam voltage to one side or the other of the value produced by the direct-current supply.

Experiments have shown that for pulses of center frequencies of about 4,000 megacycles, it is possible to produce a shift in center frequency as great as 500 megacycles. If, therefore, the frequency of the phase modulating signal from oscillator 32 is properly related to the repetition frequency of the pulses applied to the traveling wave amplifier and the two signals are properly phased, each pulse occurs during the time in which the same relative change in transmission velocity is made within the traveling wave tube and each of the pulses traversing the amplifier is, therefore, given the same shift in center frequency. Ordinarily this is best accomplished by making the frequency of the modulating signal equal to the repetition rate or frequency of the pulses. If the frequency of the phase modulating signal is an even submultiple of the repetition frequency of the pulses, alternate pulses may be shifted in center frequency in opposite senses. If the use of such a phase modulating frequency is desirable for other reasons, it may be convenient to include a filter 36 in the output circuit of the amplifier to reject pulses in which the undesired frequency shift is produced.

In accordance with an additional feature of the present invention, the frequency shifting pulse repeater employing a traveling wave tube is operated in such a way as to provide pulse shaping or gating action without the necessity of using any additional equipment. This pulse shaping or gating action is produced by suitable choice of the characteristics of the continuous wave signal used to obtain frequency shifting. It will be recalled from the above that the traveling wave tube amplifier will give effective amplification only when the beam voltage falls within a relatively restricted range of values as indicated in Fig. 2. If, during the time that electromagnetic energy is passing along the helix of the traveling wave tube, the beam voltage is swept through the range of values referred to above, the amplification afforded by the tube will be correspondingly varied. Thus, where the rate of change of beam voltage is such that during the time a radio frequency pulse is progressing along the helix of the tube, the beam voltage is swept from a value below the range permitting amplification through the amplifying region and beyond, certain portions of the pulse will be amplified to a greater extent than others.

Figure 3:
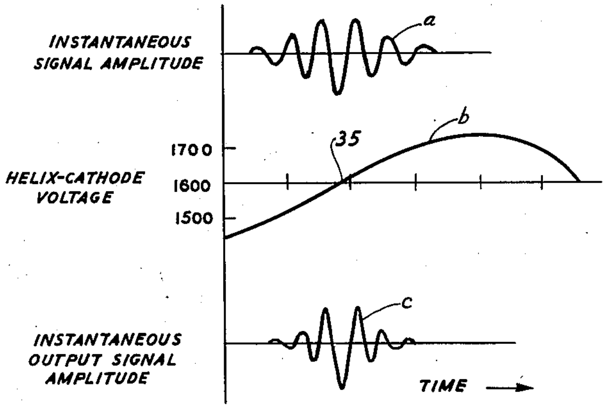
Fig. 3 is a series of curves illustrating certain aspects of the operation of the repeater of Fig. 1.

The effect of such variation in amplification during the time in which a radio frequency pulse is traversing the traveling wave tube, is illustrated by the curves of Fig. 3. Curve *a* illustrates a typical radio frequency pulse of the type which may be employed in microwave pulse modulation systems. If, while this pulse is passing through a traveling wave amplifier having the characteristics shown in Fig. 2, the amplification thereof is varied by changing the helix-to-cathode voltage as shown in curve *b*, the net result will be the production of a pulse as shown in curve *c* which is sharper than the applied pulse, since the maximum amplification occurs only during the center portion of the pulse. Since the change in beam voltage also produces phase modulation as described above and depending upon the sense in which the helix-to-cathode voltage is changing at the time the pulse passes through the amplifier, the center frequency of the pulse may be increased or decreased at the same time that sharpening of the pulse occurs. Necessarily, the extent to which a pulse is sharpened depends upon the rate at which the beam voltage is swept through the critical range. Where the signal injected to produce frequency shifting and pulse sharpening is sinusoidal, the maximum time rate of change of beam voltage occurs as the sine wave passes through zero amplitude as indicated at 35 on curve *b* of Fig. 3. The slope of the modulating wave at this point and thus the pulse sharpening or gating action may be varied either by increasing the frequency of the modulating sinusoid or by increasing the amplitude of the wave so that the entire range of amplification of the traveling wave tube is covered by a relatively small part of the total amplitude of the modulating wave.

This action of the traveling wave amplifier in response to the variation of beam voltage may thus be made so pronounced that pulses may be gated or generated from a continuous radio frequency wave applied to the amplifier in lieu of the pulsed input heretofore considered. Under such circumstances, because the helix-to-cathode voltage varies sinusoidally, pulses will be produced at the output of the amplifier twice during each cycle of the modulating wave and will have center frequencies which are alternately higher and lower than the original frequency of the continuous wave input signal. In one typical system, pulses as short as 0.002 microsecond have been produced by gating a continuous wave input having a frequency of 4,000 megacycles per second. If it is desired to produce a train of output pulses all having the same center frequencies, the unwanted pulses of the other frequency may be eliminated through the provision of a filter in the output circuit; for example, the filter 36 in wave guide 26 as shown in Fig. 1. Since the frequency shift may be as great as 500 megacycles, it is possible to separate the alternate pulses with conventional wave guide filters. Alternatively, the beam of the traveling wave tube may be turned off by application to grid 14 of a suitable blanking signal during the time in which the undesired pulse would ordinarily be generated by phase modulation of the tube. Such a blanking signal could conveniently be obtained from the modulating oscillator 32.

Figure 4:
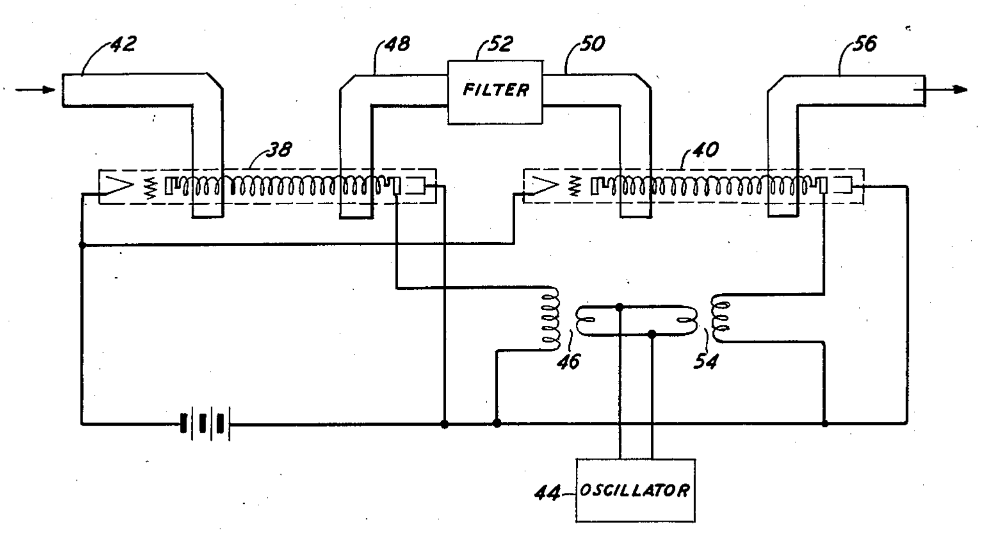
Fig. 4 is a block diagram of a modification of the invention to provide independent control of the pulse shape and the center frequency.

Fig. 4 illustrates a modification of the circuit of Fig. 1 which permits independent control of the wave form and of the center frequency of pulses passing through the repeater. To this end, there are provided two traveling wave amplifiers 38 and 40 each similar to the amplifier illustrated in Fig. 1. Incoming pulse signals of center frequency F are applied to amplifier 38 through wave guide 42 and are acted upon by a phase modulating signal derived from an oscillator 44, the output of which is applied through a transformer 46, the secondary winding of which is connected between the helix and cathode of amplifier 38. Since the pulse sharpening action of the phase modulated traveling wave amplifier increases as the rate of change of the helix-to-cathode voltage increases, the turns ratio of transformer 46 is adjusted in such a way that the variation of helix-to-cathode voltage is of relatively high amplitude, it being understood that for the same oscillator frequency, the greater the amplitude of the output signal, the greater the time rate of change of the instantaneous amplitude of the output. Such a change in the helix-to-cathode voltage results in the production of very sharp pulses in the output circuit 48 of the traveling wave amplifier 38 and at the same time produces a considerable change in the center frequency of the pulses.

These output pulses, the frequency of which may be expressed as $F \pm f$, where $$f=\frac{1}{2\pi}\frac{d\Phi_1}{dt}$$

in which $\Phi_1$ represents the phase of the signal from amplifier 38, are applied to the input circuit 50 of the second traveling wave amplifier 40 through a filter 52 which passes only one of these frequencies. The phase modulating signal applied to traveling wave amplifier 40 from oscillator 44 is of relatively low amplitude and, therefore, the time rate of change of the helix-to-cathode voltage is low as compared with that occurring in the traveling wave amplifier 38. This is accomplished through the provision of a different turns ratio in transformer 54 by means of which the output of the same oscillator 44 is applied between the helix-to-cathode of the second traveling wave amplifier. The low time rate of change thus provided is nevertheless effective to shift the center frequency of the pulses traversing amplifier 40. On the other hand, such variation in beam voltage as is accomplished in this amplifier is not accompanied by any substantial change in the shape of the relatively short pulses as they pass through the amplifier. The center frequency of the pulses appearing at the output of amplifier 40 may be expressed as $$F\pm\frac{1}{2\pi}\left(\frac{d\Phi_1}{dt}\pm\frac{d\Phi_2}{dt}\right)$$

where $\Phi_2$ is the phase angle of the pulses in amplifier 40.

Accordingly, the center frequency of the pulses appearing in the output circuit 56 of amplifier 40 may be brought back to the center frequency of the pulses applied to the input circuit of amplifier 38 by phasing the two modulating signals in such a way that they are applied to the two traveling wave amplifier tubes in phase opposition. On the other hand, an additional shift in center frequency may be obtained by phasing both of the modulating signals in the same sense or if suitable phase shifting devices are interposed in the phase modulating circuits for the second amplifier, the center frequency may be brought to a point different from that of the pulses applied to input circuit 42 and suitable for transmission from a repeater station.

Figure 5:
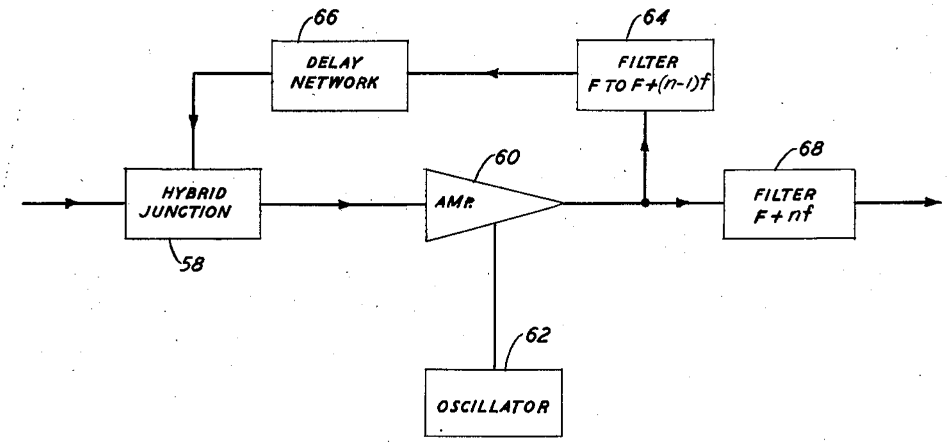
Fig. 5 is a block diagram of another modification of the invention for the purpose of obtaining very large changes in center frequency.

If it is desired to produce very large changes in the center frequency of pulses arriving at a repeater station of a microwave pulse transmission system, a modification of the invention as shown in block form in Fig. 5, is useful. Here incoming pulses are applied to a hybrid junction 58 and therethrough to a traveling wave amplifier 60 in which they are phase modulated by a signal applied between the helix and cathode of the tube from an oscillator 62. Let it be assumed that the center frequency of the incoming pulses is F and that as a result of phase modulation the center frequency of the pulses appearing in the output of amplifier 60 upon one traversal thereof is $F+f$. The output pulses are next reapplied to the input of the amplifier so that an additional shift in center frequency may be accomplished. To this end there is provided a feedback or loop circuit including a filter 64 and a delay network 66. The filter 64 has a pass-band such that it accepts in the frequency range extending from F to $F+(n-1)f$, where $n$ indicates the number of traversals of the amplifier desired. Delay network 66 retards the pulses in the loop sufficiently to separate the pulse reapplied to the amplifier through hybrid junction 58 from the original pulse. The pulse which is reapplied in the amplifier through the loop circuit is given an additional shift of center frequency as a result of the phase modulation of the amplifier and is again applied through the loop circuit to the input of the amplifier. When the desired number of round trips through the loop circuit has been made, the pulses will have been shifted to a center frequency which will not be accepted by filter 64 and they may be extracted from the loop circuit through an output circuit including a filter 68 having a high-pass characteristic beginning at a frequency of $F+nf$. In the operation of this circuit, the number of traversals which may be made of the loop circuit will be determined to some extent by the interval between successive pulses applied to the repeater. Inasmuch as it is desired to produce the same shift in center frequency upon each traversal of the amplifier by the pulses circulating in the loop circuit the frequency of the phase modulating wave from oscillator 62 must be an integral multiple of the pulse repetition rate and will depend upon the number of traversals of the amplifier which it is desired to produce. It will be understood that the pulses passing into the repeater of Fig. 5 may be sharpened as well as shifted in frequency by phase modulation of amplifier 60 in the same way as the simultaneous sharpening and frequency shifting of the pulses as accomplished in the circuit of Fig. 1. The total extent of frequency shift obtainable in this fashion is limited only by the band width of the amplifier itself.

What is claimed is:

1. A frequency changing repeater for pulse signals of center frequency F and a given repetition rate comprising an amplifier, means for applying said signals thereto, a source of oscillating waves of frequency integrally related to said repetition rate, and means for applying said waves to said amplifier to phase modulate said pulse signals in said amplifier.

2. A frequency shifting repeater for periodic electromagnetic energy comprising a traveling wave tube amplifier, means for establishing appropriate potentials therein, means for applying input electromagnetic energy to said amplifier, and means for shifting the center frequency of said energy comprising means for generating a sinusoidal wave of frequency which is an integral multiple of the repetition rate of said energy, and means for applying said sinusoidal wave to phase modulate said electromagnetic energy during its traverse of said amplifier.

3. A frequency changing repeater for periodic radio frequency pulses of a given repetition rate comprising an amplifier for said pulses, a source of sinusoidal waves of frequency equal to the repetition rate of said pulses, and means for applying said sinusoidal waves to phase modulate said amplifier during the occurrence therein of each of said pulses.

4. In a frequency shifting repeater, a traveling wave tube having at least a cathode and helix therein, means for developing a direct-current potential between said cathode and helix to establish a beam of electrons therebetween, means for generating a sinusoidal varying wave, and means for superimposing said wave upon the direct-current potential between said helix and said cathode.

5. A frequency changing repeater for radio frequency pulses of center frequency F and a given repetition rate comprising a traveling wave tube including at least a cathode and a helix, means for establishing a difference in potential between said helix and said cathode to support propagation of a beam of electrons therebetween, means for applying said pulses to said helix, and means for varying the potential between said cathode and said helix at a frequency equal to the repetition rate of said pulses and during the time that each pulse is present upon said helix.

6. A frequency shifting repeater for radio frequency pulses of center frequency F and a given repetition rate comprising a traveling wave tube amplifier having a cathode and a helix therein, means for maintaining said helix at a potential which is positive with respect to that of said cathode, means for applying said pulses to said helix, and means for varying the cathode-helix potential as each pulse travels along said helix, said means comprising a source of sinusoidal waves of frequency equal to the repetition rate of said pulses, and means for superimposing said waves upon the cathode-helix potential.

7. A frequency shifting repeater for periodic pulses comprising a traveling wave tube having a cathode and a helix, means for establishing a difference of potential between said cathode and said helix to produce a beam of electrons traveling at a given velocity therebetween, and means for varying the velocity of said beam as each of said pulses traverses said traveling wave tube.

8. Means for gating electromagnetic energy comprising a traveling wave amplifier having a cathode and a collector, means to apply said energy to the input of said amplifier, means connected to said amplifier for forming a beam of electrons between said cathode and said collector, and a source of sinusoidally varying voltage connected between said cathode and said collector.

9. A pulse shaping circuit for sharpening the individual pulses of a series of periodic pulses comprising a traveling wave tube amplifier having a cathode, a helix and a collector, means for establishing a difference in potential between said cathode and said helix, and means for varying said potential at a frequency which is an integral multiple of said repetition rate.

10. In a gate for periodic pulses occurring at a given repetition rate a traveling wave tube having a cathode and a helix and characterized in that amplification is produced thereby only for a limited range of cathode-helix potentials, means for establishing a cathode-helix potential at the center of said range, means for applying said pulses to said helix, and means for rapidly sweeping said cathode-to-helix potential through said range during the time that each of said pulses is present upon said helix.

11. Apparatus for gating electromagnetic energy which comprises a traveling wave amplifier having a cathode and a helix, said amplifier being effective to produce amplification of input energy only when the cathode-helix voltage is within a limited range, means for applying said energy to the input of said amplifier, a direct-current source connected between said cathode and said helix and adapted to apply a voltage therebetween falling at the approximate center of said range and a source of sinusoidally varying voltage having a peak-to-peak voltage greater than said range of voltage connected between said cathode and helix.

12. Apparatus for gating electromagnetic energy comprising a helical transmission line, means for propagating said energy along said line, means for forming an electron beam parallel and adjacent to the longitudinal axis of said helical line, a source of direct-current potential connected between the helical line and said beam forming means to give the beam a velocity falling within a limited range of velocities centered upon the velocity of propagation along said helical line, and means for varying said beam velocity through and beyond said range while electromagnetic energy to be gated is present in said helical line.

13. In a gate for periodic pulses occurring at a given repetition rate, a traveling wave tube having a cathode and a helix and characterized in that amplification is produced thereby only for a limited range of cathode-helix potentials, means for establishing a cathode-helix potential at the center of said range, means for applying said pulses to said helix, and means for superimposing upon said cathode-to-helix potential a sinusoidal varying wave of frequency equal to said repetition rate and of amplitude which is large with respect to said range.

14. In a gating circuit for producing periodic pulses at a desired repetition rate from a continuous wave of radio frequency, a traveling wave tube having a cathode and helix therein and characterized in that it provides amplification for only a limited range of cathode-to-helix potentials, means for establishing a cathode-helix potential falling at substantially the center of said range, means for applying said continuous wave to the input of said amplifier, and means for sweeping said cathode-helix potential through said range at a frequency integrally related to said pulse repetition rate.

15. Apparatus for recurrently gating electromagnetic energy which comprises a helical transmission line, means for propagating said energy along said helical line, means for forming an electron beam along a path parallel to the longitudinal axis of said helical line, a source of potential connected to said last-named means to control the velocity of the electrons of said beam and adjusted to give the said electrons a velocity within a range approximating the velocity of propagation in said line for which amplification of said energy occurs, and a source of alternating potential connected to said beam forming means to vary said velocity, said alternating potential having a peak-to-peak value sufficient to vary said velocity beyond the range within which appreciable amplification of said energy will be realized.

16. In a pulse repeater, means for sharpening periodic pulses applied thereto, comprising a traveling wave tube having a helix and a cathode and characterized in that amplification is produced thereby only for a limited range of cathode-helix potentials, means for normally maintaining a cathode-helix potential falling at the center of said range, means for applying said pulses to said amplifier, means for sweeping said cathode-helix potential rapidly through said range during the time that each of said pulses is present in said amplifier, said operation serving both to sharpen said pulses and to produce a shift in the center frequency thereof, and means for restoring the center frequency of said sharpened pulses to its original value.

17. In a repeater for periodic radio frequency pulses of center frequency F and a given repetition rate, a traveling wave tube amplifier for said pulses, said amplifier having a cathode and a helix and providing amplification only when the cathode-helix potential falls within a limited range, means for establishing a potential between said cathode and helix falling at the center of said range, a source of oscillating waves of frequency equal to the repetition rate of said pulses, and of amplitude which is large with respect to said range, and means for applying said wave between said cathode and said helix to sweep the cathode-helix potential through said range in the same direction during the time in which each pulse is present in said amplifier.

18. In a repeater for radio frequency pulses of center frequency F and a given repetition rate, means for shifting the center frequency of said pulses and gating said pulses to improve the wave form thereof comprising a traveling wave amplifier, means to apply said pulses thereto, said amplifier having a cathode and a helix and providing amplification only when the cathode-helix potential falls within a limited range of values, means for generating a sinusoidal wave of amplitude which is large with respect to said range, and of frequency equal to said repetition rate, means for applying said sinusoidal wave between the cathode and helix of said traveling wave tube to sweep the cathode-helix potential through the range in the same direction while each pulse is present in said amplifier, a second traveling wave amplifier identical to the first, means for applying the output of the first traveling wave amplifier to the input of the second, means for generating a sinusoidal wave of the same frequency as said first sinusoidal wave but of amplitude which is low with respect to said first wave, and means for applying said second sinusoidal wave to vary the cathode-to-helix potential of said second traveling wave tube during the time that each of said pulses is present therein.

19. In a frequency shifting repeater for periodic pulses of given center frequency and occurring at a given repetition rate, a traveling wave amplifier, means for applying said pulses thereto, means for phase modulating said amplifier during the time that each of said pulses is present therein, means for applying the output of said amplifier to the input thereof after a delay equal to the length of said pulses to permit an additional shift in the center frequency of said pulses, and means for abstracting said pulses from the loop circuit including said amplifier after a chosen number of trips around said loop.

20. In a frequency shifting repeater for periodic radio frequency pulses of center frequency F, a traveling wave amplifier, means for applying said pulses to the input thereof, means for phase modulating said amplifier to produce a given change in said center frequency for each pulse during its traverse of the amplifier, and means for applying pulses occurring at the output of said amplifier to the input thereof after a delay equal to the length of said pulses and during the interval between said periodic pulses applied to the input of said amplifier to permit the production of a further shift in the center frequency of said pulses.

21. A frequency changing repeater for periodic pulse signals of instantaneous frequency F comprising an amplifier for said pulses, means for phase modulating the pulses in said amplifier at a frequency which is an integral multiple of the pulse rate, a loop circuit connecting the phase modulated output of said amplifier to the input thereof including a filter having a pass-band extending from F to $F+(n-1)f$ where $n$ is the number of traversals of the amplifier to effect a desired frequency shift and $f$ is the frequency shift effected upon each traversal and means introducing a delay equal to an integral multiple of the pulse period and an output connection from said amplifier having a frequency characteristic such that it accepts all pulses of instantaneous frequency greater than $F+nf$.

22. A frequency changing repeater for periodic pulse signals of center frequency F comprising a traveling wave tube amplifier for said pulses having a cathode and a helix, means for phase modulating the pulses in said amplifier by varying the cathode-helix potential at a frequency equal to the pulse rate, a loop circuit connecting the phase modulated output of said amplifier to the input thereof including a filter having a pass-band extending from F to $F+(n-1)f$ where $n$ is the number of traversals of the amplifier to effect a desired frequency shift and $f$ is the frequency shift effected upon each traversal and means introducing a delay equal to an integral multiple of the pulse period and an output connection from said amplifier having a frequency characteristic such that it accepts all pulses of instantaneous frequency greater than $F+nf$.

CASSIUS C. CUTLER.

REFERENCES CITED

The following references are of record in the file of this patent:

UNITED STATES PATENTS

| Number | Name | Date |
| --- | --- | --- |
| 2,096,460 | Llewellyn | Oct. 19, 1937 |
| 2,412,995 | Levy | Dec. 24, 1946 |